(12) United States Patent
Nishiyama

(10) Patent No.: US 10,781,328 B2
(45) Date of Patent: *Sep. 22, 2020

(54) ACTINIC-RAY-CURABLE INK-JET INK AND INK-JET RECORDING METHOD

(71) Applicant: Konica Minolta, Inc., Chiyoda-ku, Tokyo (JP)

(72) Inventor: Hiromichi Nishiyama, Tokyo (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/070,677

(22) PCT Filed: Jan. 13, 2017

(86) PCT No.: PCT/JP2017/001069
§ 371 (c)(1),
(2) Date: Jul. 17, 2018

(87) PCT Pub. No.: WO2017/126439
PCT Pub. Date: Jul. 27, 2017

(65) Prior Publication Data
US 2019/0023925 A1    Jan. 24, 2019

(30) Foreign Application Priority Data
Jan. 20, 2016   (JP) .................. 2016-009134

(51) Int. Cl.
| | | |
|---|---|---|
| *C09D 11/38* | (2014.01) | |
| *B41M 5/00* | (2006.01) | |
| *B41M 7/00* | (2006.01) | |
| *C09D 11/101* | (2014.01) | |
| *C09D 11/322* | (2014.01) | |

(52) U.S. Cl.
CPC ............ *C09D 11/38* (2013.01); *B41M 5/00* (2013.01); *B41M 7/0081* (2013.01); *C09D 11/101* (2013.01); *C09D 11/322* (2013.01)

(58) Field of Classification Search
CPC ..... C09D 11/38; C09D 11/101; C09D 11/322; B41M 7/0081; B41M 5/00
See application file for complete search history.

(56) References Cited

U.S. PATENT DOCUMENTS

| | | | |
|---|---|---|---|
| 4,931,095 A | 6/1990 | Nowak et al. | |
| 5,980,624 A * | 11/1999 | Ichikawa | ............... C09D 11/16 106/31.58 |
| 2014/0348756 A1* | 11/2014 | Doering | ................. A61Q 15/00 424/43 |

FOREIGN PATENT DOCUMENTS

| | | |
|---|---|---|
| EP | 1221467 A1 | 7/2002 |
| WO | 2014016129 A | 1/2014 |

OTHER PUBLICATIONS

International Search Report corresponding to Application No. PCT/JP2017/001069; dated Feb. 21, 2017.

* cited by examiner

*Primary Examiner* — Jessica M Roswell
(74) *Attorney, Agent, or Firm* — Cantor Colburn LLP

(57) ABSTRACT

A purpose of the present invention is to provide an actinic-ray-curable ink-jet ink that gives images of satisfactory quality at temperatures, the center of which lies in a moderate range and that, even when the temperature of the substrate changes to the higher-temperature or lower-temperature side, can give prints of satisfactory quality. The actinic-ray-curable ink-jet ink includes an actinic-ray-curable compound and a gellant. The gellant contains at least one $C_{15-26}$ alkyl group. The actinic-ray-curable ink-jet ink contains a crystal nucleator, the crystal nucleator comprising a (poly)glycerin fatty acid ester compound A that comprises a (poly)glycerin skeleton and a $C_{15}$ or higher alkyl group bonded to the (poly)glycerin skeleton. The content of the compound A is 1.0-10 mass % with respect to the total mass of the gellant.

4 Claims, No Drawings

ACTINIC-RAY-CURABLE INK-JET INK AND INK-JET RECORDING METHOD

CROSS REFERENCE TO RELATED APPLICATIONS

This is the U.S. national stage of application No. PCT/JP2017/001069, filed on Jan. 13, 2017. Priority under 35 U.S.C. § 119(a) and 35 U.S.C. § 365(b) is claimed from Japanese Application No. 2016-009134, filed on Jan. 20, 2016, the disclosures all of which are also incorporated herein by reference.

TECHNICAL FIELD

The present invention relates to an actinic radiation-curable inkjet ink and an inkjet recording method.

BACKGROUND ART

An image forming method using an inkjet recording method is a method for forming an image by discharging an ink supplied from an ink tank through a channel from a recording head for discharge. The inkjet recording method can form an image simply and inexpensively and therefore has been used for forming various images. As one of the inks for use in the inkjet recording method, there is an actinic radiation-curable inkjet ink. The actinic radiation-curable inkjet ink includes, in addition to a colorant, a photocurable compound, and therefore an ink component can be cured by polymerizing the photocurable compound through irradiation with actinic radiation such as ultraviolet rays. When an image is formed using the actinic radiation-curable inkjet ink, it is easier to immobilize a discharged ink and an image with little bleeding can be formed on various recording media than when a solvent-based ink composition is used.

For example, an ultraviolet ray-curable inkjet ink including a gelling agent is developed in order to improve a pinning property of the ultraviolet ray-curable inkjet ink. For a recording method using such an ink, a technique is studied to form an image of a higher quality through preventing color mixing and combining of dots by landing an ink on a recording medium and allowing the landed ink droplet to undergo gelation.

For example, an hot melt ink composition including not only a gelling agent, but also a crystalline material and a crystallization retardant is known (PTL 1). In this invention, the crystalline material, while improving the strength of an ink cured on a recording medium, may affect an image quality, and therefore the crystallization retardant is added to thereby decrease the crystallization rate, resulting in an enhancement in the image quality. The crystallization retardant for use in the hot melt ink composition is not a substance for suppressing crystallization of the gelling agent.

CITATION LIST

Patent Literature

PTL 1: WO 2014/016129

SUMMARY OF INVENTION

Technical Problem

There has been a problem that when a conventional actinic radiation-curable inkjet ink including a gelling agent is used for printing, the change in image quality is caused by the variation in base material (recording medium) temperature. There has been a problem that the amount of the gelling agent is needed to be increased in order not to cause the change in image quality even in the case where the base material temperature is varied to a higher temperature or a lower temperature; however, with an increase in the amount of the gelling agent, a temperature at which a good image quality can be obtained increases, thereby resulting in increases in the load of an apparatus and the consumption of energy as well as a difficult temperature control.

The present invention has been completed in view of the above-described circumstances, and an object of the present invention is to provide an actinic radiation-curable inkjet ink which has a center temperature at which a good image quality can be obtained within a proper range, and which can provide a print with a good image quality even in the case where the base material temperature is varied to a higher temperature or a lower temperature.

Solution to Problem

In view of the above problems, a first aspect of the present invention relates to an actinic radiation-curable inkjet ink.

[1] An actinic radiation-curable inkjet ink including an actinic radiation curable compound and a gelling agent, in which the gelling agent includes at least one $C_{15}$-$C_{26}$ alkyl group, the actinic radiation-curable inkjet ink includes a crystal nucleating agent, the crystal nucleating agent includes (poly)glycerin fatty acid ester compound A having a (poly)glycerin main chain and an alkyl group having 15 or more carbon atoms bound to the (poly)glycerin main chain, and a content of (poly)glycerin fatty acid ester compound A relative to a total mass of the gelling agent is 1.0 mass % or more and 80 mass % or less.

[2] The actinic radiation-curable inkjet ink according to [1], in which a difference between the number of carbon atoms of the alkyl group in the gelling agent and the number of carbon atoms of the alkyl group in compound A is 2 or less.

[3] The actinic radiation-curable inkjet ink according to [1] or [2], in which a content of the gelling agent relative to a total mass of the actinic radiation-curable inkjet ink is 1 mass % or more and 10 mass % or less.

A second aspect of the present invention relates to the following inkjet recording method.

[4] An inkjet recording method including discharging the actinic radiation-curable inkjet ink according to any one of [1] to [3] on a recording medium, and irradiating the ink discharged on the recording medium with actinic radiation to cure the ink.

Advantageous Effects of Invention

According to the present invention, a crystal nucleating agent is added to an actinic radiation-curable inkjet ink, thereby providing the actinic radiation-curable inkjet ink which has a center temperature at which a good image quality can be obtained within a proper range, and which can provide a print good in image quality even in the case where the base material temperature is varied to a higher temperature or a lower temperature.

DESCRIPTION OF EMBODIMENTS

The inventor has made intensive studies, and as a result, has found that at a higher base material temperature, the difference in temperature between a base material and a gelling agent-containing actinic radiation-curable inkjet ink heated decreases, and therefore the gelling agent-containing actinic radiation-curable inkjet ink cools more slowly to more easily result in crystal growth from crystallization of the gelling agent, as compared to at a lower base material temperature. Furthermore, it has been found that crystallization of the gelling agent includes a crystal nucleus generation process and a crystal nucleus growth process, and the crystal nucleus growth process becomes predominant when cooling occurs slowly and the crystal nucleus generation process becomes predominant when a difference in temperature between the base material and the gelling agent-containing actinic radiation-curable inkjet ink is large and cooling occurs rapidly. Therefore, when the gelling agent-containing actinic radiation-curable inkjet ink is slowly cooled and crystallization of the gelling agent occurs, the crystal nucleus growth process becomes predominant to result in the occurrence of a phenomenon where crystals of the gelling agent are coarsened. It has been found that the crystals of the gelling agent are coarsened to thereby cause an adverse effect on the image quality.

A crystal nucleus which is generated by climbing over the energy barrier necessary for crystal nucleus formation is advanced to a crystal growth process. Such a process is a process where a gelling agent present in a melt (or solution) collides with the surface of a crystal and is incorporated into the crystal. It is considered that, when a crystal nucleating agent is present in the solution or melt during the process, the crystal nucleating agent can adsorb to the growth face of a crystal of the gelling agent to inhibit growth of the crystal of the gelling agent, relatively promoting crystal nucleus generation than crystal nucleus growth, thereby inhibiting the crystal of the gelling agent from being coarsened, to achieve printing at a stable image quality regardless of the base material temperature.

1. Actinic Radiation-Curable Inkjet Ink

The actinic radiation-curable inkjet ink of the present invention includes an actinic radiation curable compound, a gelling agent and a crystal nucleating agent.

[Actinic Radiation Curable Compound]

The actinic radiation curable compound is a photocurable compound that is crosslinked or polymerized by actinic radiation. Examples of the actinic radiation include electron beams, ultraviolet rays, α rays, γ rays, and X rays, and ultraviolet rays, and electron beams are preferable. The actinic radiation curable compound is a radical polymerizable compound or a cationic polymerizable compound and is preferably a radical polymerizable compound.

The radical polymerizable compound is a compound (monomer, oligomer, polymer, or mixtures thereof) which has an ethylenically unsaturated bond, which is radically polymerizable. These radical polymerizable compounds may be used singly or in combination of two or more types thereof.

Examples of the compound which has an ethylenically unsaturated bond, which is radically polymerizable, include an unsaturated carboxylic acid and a salt thereof, an unsaturated carboxylic acid ester compound, an unsaturated carboxylic acid urethane compound, an unsaturated carboxylic acid amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among them, the radical polymerizable compound is preferably an unsaturated carboxylic acid ester compound, and more preferably a (meth)acrylate. The (meth)acrylate compound is not limited to the monomers described later but may be an oligomer, a mixture of a monomer and an oligomer, a modified product, an oligomer having a polymerizable functional group, or the like.

Examples of the (meth)acrylate include: monofunctional monomers such as isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxyethyl hexahydrophthalate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl succinate, 2-(meth)acryloyloxyethyl phthalate, 2-(meth)acryloyloxyethyl-2-hydroxyethyl-phthalate, and t-butylcyclohexyl (meth)acrylate;

bifunctional monomers such as triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, bisphenol A-PO adduct di(meth)acrylate, hydroxy pivalic acid neopentyl glycol di(meth)acrylate, and polytetramethylene glycol di(meth)acrylate; and polyfunctional monomers which are trifunctional or higher-functional monomers such as trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate.

Among the (meth)acrylates, stearyl (meth)acrylate, lauryl (meth)acrylate, isostearyl (meth)acrylate, ethoxy diethylene glycol (meth)acrylate, isobornyl (meth)acrylate, tetraethylene glycol di(meth)acrylate, glycerin propoxy tri(meth)acrylate, and the like are preferable from the viewpoint of photosensitivity and the like.

The (meth)acrylate may be a modified product. Examples of the modified product include: ethylene oxide-modified (meth)acrylates such as ethylene oxide-modified trimethylolpropane tri(meth)acrylate and ethylene oxide-modified pentaerythritol tetraacrylate; caprolactone-modified (meth)acrylates such as caprolactone-modified trimethylolpropane tri(meth)acrylate; and caprolactam-modified (meth)acrylates such as caprolactam-modified dipentaerythritol hexa(meth)acrylate.

In the present invention, at least a part of the actinic radiation curable compound is preferably an ethylene oxide-modified (meth)acrylate.

Examples of the ethylene oxide-modified (meth)acrylate include 4EO-modified hexanediol diacrylate CD561, 3EO-modified trimethylol propane triacrylate SR454, 6EO-modified trimethylol propane triacrylate SR499 and 4EO-modified pentaerythritol tetraacrylate SR494 manufactured by Sartomer; polyethylene glycol diacrylate NK ester A-400, polyethylene glycol diacrylate NK ester A-600, polyethylene glycol dimethacrylate NK ester 9G and polyethylglycol dimethacrylate NK ester 14G manufactured by Shin-Nakamura Chemical Co., Ltd.; tetraethylene glycol diacrylate V #335HP manufactured by Osaka Organic Chemical Industry Ltd.; 3PO-modified trimethylol propane triacrylate Photomer 4072 manufactured by Cognis Corporation; and 1,10-decanediol dimethacrylate NK ester DOD-N, tricyclodecane dimethanol diacrylate NK ester A-DCP and tricyclodecane dimethanol dimethacrylate NK ester DCP manufactured by Shin-Nakamura Chemical Co., Ltd.

The (meth)acrylate may be a polymerizable oligomer, and examples of the polymerizable oligomer include epoxy (meth)acrylate oligomers, aliphatic urethane (meth)acrylate oligomers, aromatic urethane (meth)acrylate oligomers, polyester (meth)acrylate oligomers, and straight-chain (meth)acrylate oligomers.

The cationic polymerizable compound can be an epoxy compound, a vinyl ether compound, an oxetane compound, or the like. These cationic polymerizable compounds may be used singly or in combination of two or more types thereof.

The epoxy compound refers to an aromatic epoxide, an alicyclic epoxide, an aliphatic epoxide, or the like, and the aromatic epoxide and the alicyclic epoxide are preferable in order to improve curability.

The aromatic epoxide can be a diglycidyl ether or a polyglycidyl ether obtained by reacting a polyhydric phenol or an alkylene oxide adduct thereof with epichlorohydrin. Examples of the polyhydric phenol or the alkylene oxide adduct thereof which is subjected to the reaction include bisphenol A or an alkylene oxide adduct thereof. The alkylene oxide in the alkylene oxide adduct can be ethylene oxide, propylene oxide, or the like.

The alicyclic epoxide can be a cycloalkane oxide-containing compound obtained by epoxidizing a cycloalkane-containing compound with an oxidizing agent such as hydrogen peroxide or a peracid. The cycloalkane in the cycloalkane oxide-containing compound can be cyclohexene or cyclopentene.

The aliphatic epoxide can be a diglycidyl ether or a polyglycidyl ether obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide, propylene oxide, or the like.

Examples of the vinyl ether compound include:
monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and
divinyl or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether. Among these vinyl ether compounds, divinyl or trivinyl ether compounds are preferable taking curability and adhesion into consideration.

The oxetane compound refers to a compound having an oxetane ring, and examples thereof include oxetane compounds described in Japanese Patent Application Laid-Open Nos. 2001-220526, 2001-310937, and 2005-255821. Examples thereof include a compound represented by Formula (1) described in paragraph [0089] of Japanese Patent Application Laid-Open No. 2005-255821, a compound represented by Formula (2) described in paragraph [0092], a compound represented by Formula (7) described in paragraph [0107] thereof, a compound represented by Formula (8) described in paragraph [0109] thereof, and a compound represented by Formula (9) described in paragraph [0116] thereof. Formulas (1), (2), and (7) to (9) described in Japanese Patent Application Laid-Open No. 2005-255821 are shown below.

[Formula 1]

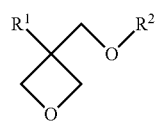

Formula (1)

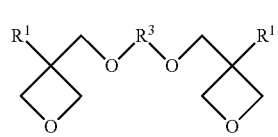

Formula (2)

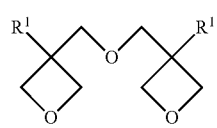

Formula (7)

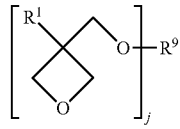

Formula (8)

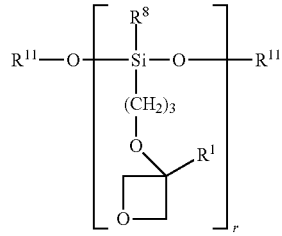

Formula (9)

The content of the actinic radiation-curable compound in the actinic radiation-curable inkjet ink is preferably from 1 to 97 mass %, more preferably from 30 to 95 mass %.

[Gelling Agent]

The actinic radiation-curable inkjet ink includes a gelling agent. The gelling agent in the present invention is defined as a "compound that is an organic substance which is a solid at ordinary temperature and which is a liquid when heated, and that has a function to conduct reversible sol-gel phase transition of the actinic radiation-curable inkjet ink depending on the temperature".

The actinic radiation-curable inkjet ink includes a compound including at least one $C_{15}$-$C_{26}$ alkyl group, as the gelling agent. The gelling agent includes a $C_{15}$-$C_{26}$ alkyl group, thereby imparting a good interaction with a crystal nucleating agent described below, suppressing coarsening of a crystal of the gelling agent, and imparting a good image quality even in the case where the base material temperature is changed. The alkyl group of the gelling agent may have a branched chain.

More specifically, when the number of carbon atoms is less than 15, crystallization of the gelling agent hardly occurs and the interaction with a crystal nucleating agent described below also hardly occurs, and therefore coarsening of the crystal of the gelling agent is hardly suppressed. When the number of carbon atoms is more than 26, the melting point is too high and thus the gelling agent is dissolved in an ink only by increasing the discharge temperature of an ink.

Examples of the gelling agent for use in the actinic radiation-curable inkjet ink of the present invention include higher fatty acids, fatty acid esters, fatty acid amines, aliphatic ketones and fatty acid amides including at least one $C_{15}$-$C_{26}$ alkyl group, and fatty acid esters or aliphatic ketones are more preferable.

When the gelling agent is crystallized in an ink, a space three-dimensionally surrounded by plate-like crystals, a crystallization product of the gelling agent, is preferably formed so that the actinic radiation curable compound is included in the space. A structure in which an actinic radiation curable compound is included in a space three-dimensionally surrounded by plate-like crystals may be referred to as a "card house structure". Once the card house structure is formed, the liquid actinic radiation curable compound can be maintained therein and ink droplets can be pinned.

The aliphatic ketone as the gelling agent is, for example, a compound represented by the following formula (G1).

  Formula (G1):

In formula (G1), R1 and R2 each independently represent an alkyl group containing a $C_{15}$-$C_{26}$ straight-chain moiety, and can represent a branched or straight-chain alkyl group.

Examples of the alkyl group containing a $C_{15}$-$C_{26}$ straight-chain moiety include a docosanyl group ($C_{22}$), an icosanyl group ($C_{20}$), an octadecanyl group ($C_{18}$), a heptadecanyl group ($C_{17}$), a hexadecanyl group ($C_{16}$) and a pentadecanyl group ($C_{15}$).

The fatty acid ester as the gelling agent is, for example, a compound represented by the following formula (G2).

  Formula (G2):

In formula (G2), R3 and R4 each independently represent an alkyl group containing a $C_{15}$-$C_{26}$ straight-chain moiety, and can represent a branched or straight-chain alkyl group.

When the number of carbon atoms of the straight-chain moiety included in the alkyl group of each of R3 and R4 is 15 or more and 26 or less, the card house structure described above can be formed with crystallinity necessary as the gelling agent being kept, and the melting point is not too high, as in the gelling agent represented by formula (G1).

Preferable specific examples of the gelling agent include aliphatic ketone compounds such as 18-p entatriacontanone (Stearone) and 16-p entatriacontanone (for example, Kao Wax T1 manufactured by Kao Corporation); aliphatic monoester compounds such as cetyl palmitate, stearyl stearate and behenyl behenate (for example, UNISTAR-M-2222SL (manufactured by NOF CORPORATION), EXCEPARL SS (manufactured by Kao Corporation, melting point: 60° C.), EMALEX CC-18 (manufactured by Nihon Emulsion Co., Ltd.), AMREPS PC (manufactured by KOKYU ALCOHOL KOGYO CO., LTD.), EXCEPARL MY-M (manufactured by Kao Corporation), Spermaceti (manufactured by NOF CORPORATION) and EMALEX CC-10 (manufactured by Nihon Emulsion Co., Ltd.)); dibenzylidene sorbitols such as 1,3:2,4-bis-O-benzylidene-D-glycitol (GELL ALL D available from New Japan Chemical Co., Ltd.); petroleum wax such as paraffin wax, microcrystalline wax, and petrolatum; plant wax such as candelilla wax, carnauba wax, rice bran wax, Japan wax, jojoba oil, jojoba solid wax, and jojoba esters; animal wax such as beeswax, lanoline, and whale wax; mineral wax such as montan wax and hydrogenated wax; hydrogenated castor oil and hydrogenated castor oil derivatives; modified wax such as montan wax derivatives, paraffin wax derivatives, microcrystalline wax derivatives, or polyethylene wax derivatives; fatty acid amides such as stearic acid amide, behenic acid amide, oleic acid amide, erucic acid amide, ricinoleic acid amide, 12-hydroxystearic acid amide (for example, NIKKA AMIDE series manufactured by Nippon Kasei Chemical Company Limited, ITOWAX series manufactured by Itoh Oil Chemicals Co., Ltd., FATTYAMID series manufactured by Kao Corporation); N-substituted fatty acid amides such as N-stearyl stearic acid amide and N-oleyl palmitic acid amide; special fatty acid amides such as N,N'-ethylene-bis-stearyl amide, N,N'-ethylene-bis-12-hydroxystearyl amide, and N,N'-xylylene-bis-stearyl amide; higher amines such as octadecylamine; fatty acid ester compounds such as stearyl stearate, oleyl palmitate, sorbitan fatty acid esters, propylene glycol fatty acid esters, ethylene glycol fatty acid esters, and polyoxyethylene fatty acid esters (for example, EMALLEX series manufactured by Nihon Emulsion Co., Ltd., RIKEMAL series manufactured by RIKEN VITAMIN CO., LTD., and POEM series manufactured by RIKEN VITAMIN CO., LTD.); sucrose fatty acid esters such as sucrose stearate and sucrose palmitate (for example, RYOTO Sugar Ester series manufactured by Mitsubishi-Chemical Foods Corporation); synthetic wax such as polyethylene wax and α-olefin-maleic anhydride copolymer wax; and polymerizable wax (such as UNILIN series manufactured by Baker Petrolite—Coatings). In particular, 18-pentatriacontanone (Stearone), behenyl behenate and stearyl stearate are preferable.

These gelling agents may be used singly or in combination of two or more types thereof.

The content of the gelling agent in the actinic radiation-curable inkjet ink of the present invention is preferably 1.0 mass % or more and 10 mass % or less, more preferably 2.0 mass % or more and 4.0 mass % or less relative to the total mass of the actinic radiation-curable inkjet ink from the viewpoint of control of the center temperature (intermediate temperature between the temperature where a solid section is filled and the temperature where droplets are combined).

[Crystal Nucleating Agent]

The crystal nucleating agent in the present invention includes (poly)glycerin fatty acid ester compound A having a (poly)glycerin main chain and an alkyl group having 15 or more carbon atoms bound to the (poly)glycerin main chain. (Poly)glycerin fatty acid ester compound A having an alkyl group having 15 or more carbon atoms included in the crystal nucleating agent interacts with a carbon chain in the gelling agent. It is also considered that steric hindrance is generated by bulkiness of the (poly)glycerin main chain, thereby suppressing crystal growth due to gelling agent aggregation to promote crystal nucleus generation. When the number of carbon atoms of the alkyl group of (poly) glycerin fatty acid ester compound A is less than 15, interaction with the gelling agent hardly occurs, thereby hardly suppressing coarsening of the crystal of the gelling agent to result in poor base material temperature robustness. When no (poly)glycerin main chain is included, base material temperature robustness is poor even if the alkyl group having 15 or more carbon atoms is included. The number of carbon atoms bound to the (poly)glycerin main chain is not particularly limited, and is preferably 40 or less, more preferably 30 or less from the viewpoint of discharge stability.

(Poly)glycerin means glycerin or polyglycerin, polyglycerin means one having a structure where a plurality of glycerins are polymerized, polyglycerin where two glycerins are bound is also referred to as diglycerin, polyglycerin where three glycerins are bound is also referred to as triglycerin, and polyglycerin where ten glycerins are bound is also referred to as decaglycerin.

The content of the crystal nucleating agent in the actinic radiation-curable inkjet ink of the present invention is 1.0 mass % or more and 80 mass % or less relative to the total mass of the gelling agent described above. When the content is less than 1.0 mass %, the crystal nucleus generation effect is not sufficiently obtained and base material temperature robustness is poor. When the content is more than 80 mass %, crystal nucleus generation is excessive and the center temperature (intermediate temperature between the temperature where a solid section is filled and the temperature where droplets are combined) is out of a preferable range, thereby resulting in a difficult base material temperature control.

The content of the crystal nucleating agent in the actinic radiation-curable inkjet ink of the present invention is preferably 10 mass % or more and 40 mass % or less relative to the total mass of the gelling agent described above, from the viewpoint of base material temperature robustness and the center temperature (intermediate temperature between the temperature where a solid section is filled and the temperature where droplets are combined).

The alkyl group in the crystal nucleating agent contains a straight-chain moiety having 15 or more carbon atoms, and examples thereof can include a docosanyl group (C22), an icosanyl group (C20), an octadecanyl group (C18), a heptadecanyl group (C17), a hexadecanyl group (C16) and a pentadecanyl group (C15).

Specific examples of the crystal nucleating agent for use in the present invention include tetraglycerin tristearate, hexaglycerin tristearate, decaglycerin tristearate and decaglycerin tristearate heptabehenate.

It is preferable that the crystal nucleating agent of the present invention be not the gelling agent from the viewpoint of control of the center temperature (intermediate temperature between the temperature where a solid section is filled and the temperature where droplets are combined).

In the actinic radiation curable compound of the present invention, the difference between the number of carbon atoms of the straight-chain moiety in at least one alkyl group in the gelling agent and the number of carbon atoms of the straight-chain moiety in the alkyl group in the crystal nucleating agent is preferably 2 or less, namely, the lengths of the straight-chain moieties in such alkyl groups are preferably similar to each other. When the difference in the number of carbon atoms of the alkyl group between the gelling agent and the crystal nucleating agent is 2 or less, interaction of the crystal nucleating agent with the gelling agent is more enhanced and thus crystal nucleus generation of the gelling agent is promoted, thereby resulting in particularly good base material temperature robustness.

[Photoinitiator]

If necessary, the actinic radiation-curable inkjet ink may include a photoinitiator. The photoinitiator includes a radical photoinitiator and a cationic photoinitiator, and the radical photoinitiator includes an intramolecular bond cleaving type and an intramolecular hydrogen withdrawing type. Examples of the intramolecular bond cleaving type photoinitiator include: acetophenones such as diethoxyacetophenone, 2-hydroxy-2-methyl-1-phenylpropan-1-one, benzyl dimethyl ketal, 1-(4-isopropylphenyl)-2-hydroxy-2-methylpropan-1-one, 4-(2-hydroxyethoxy)phenyl-(2-hydroxy-2-propyl)ketone, 1-hydroxycyclohexyl-phenyl ketone, 2-methyl-2-morpholino(4-thiomethylphenyl)propan-1-one and 2-benzyl-2-dimethylamino-1-(4-morpholinophenyl)-butanone; benzoins such as benzoin, benzoin methyl ether and benzoinisopropyl ether; acylphosphine oxides such as 2,4,6-trimethylbenzoin diphenylphosphine oxide; benzil, and methylphenyl glyoxyester.

Examples of the intramolecular hydrogen withdrawing type photoinitiator include: benzophenones such as benzophenone, o-benzoyl benzoic acid methyl-4-phenylbenzophenone, 4,4'-dichlorobenzophenone, hydroxybenzophenone, 4-benzoyl-4'-methyl-diphenyl sulfide, acrylated benzophenone, 3,3',4,4'-tetra(t-butylperoxycarbonyl)benzophenone and 3,3'-dimethyl-4-methoxybenzophenone; thioxanthones such as 2-isopropylthioxanthone, 2,4-dimethylthioxanthone, 2,4-diethylthioxanthone and 2,4-dichlorothioxanthone; aminobenzophenones such as Michler's ketone and 4,4'-diethylaminobenzophenone; 10-butyl-2-chloroacridone, 2-ethylanthraquinone, 9,10-phenanthrenequinone, and camphorquinone.

Examples of the cationic photoinitiator include a photoacid-generating agent. Examples of the photoacid-generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

The content of the photoinitiator in the actinic radiation-curable inkjet ink may vary depending on the types of actinic radiation and actinic radiation curable compound, and it is preferably 0.01 mass % or more and 10 mass % or less relative to the total mass of the actinic radiation-curable inkjet ink.

[Photoinitiator Auxiliary Agent and Polymerization Inhibitor]

If necessary, the actinic radiation-curable inkjet ink may further include a photoinitiator auxiliary agent, a polymerization inhibitor, or the like. The photoinitiator auxiliary agent can be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxyethylaniline, triethylamine, and N,N-dimethylhexylamine. Among them, N,N-dimethylamino-p-benzoic acid ethyl ester and N,N-dimethylamino-p-benzoic acid isoamyl ethyl ester are preferable. These compounds may be used singly, or two or more types of these compounds may be used in combination.

Examples of the polymerization inhibitor include (alkyl)phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl-hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Colorant]

If necessary, the actinic radiation-curable inkjet ink may further include a colorant. The colorant can be a dye or a pigment, and the pigment is preferable because it has good dispersibility in ink constituents and is excellent in weather resistance. The pigment is not particularly limited and can be, for example, an organic pigment or an inorganic pigment of any of the following numbers described in Color Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177 178, 179, 184, 185, 208, 216, 226, and 257, Pigment Violet 3,19, 23, 29, 30, 37, 50, and 88, and Pigment Orange 13, 16, 20, and 36. Examples of blue or cyan pigments include Pigment Blue 1, 15, 15:1, 15:2, 15:3, 15:4, 15:6, 16, 17-1, 22, 27, 28, 29, 36, and 60. Examples of green pigments include Pigment Green 7, 26, 36, and 50. Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigments include Pigment Black 7, 28, and 26.

Examples of commercially available pigments include CHROMOFINE YELLOW 2080, 5900, 5930, AF-1300, and 2700L, CHROMOFINE ORANGE 3700L and 6730, CHROMOFINE SCARLET 6750, CHROMOFINE MAGENTA 6880, 6886, 6891N, 6790, and 6887, CHROMOFINE VIOLET RE, CHROMOFINE RED 6820 and 6830, CHROMOFINE BLUE HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, CHROMOFINE GREEN 2GN, 2GO, 2G-550D, 5310, 5370, and 6830, CHROMOFINE BLACK A-1103, SEIKAFAST YELLOW 10GH, A-3, 2035, 2054, 2200, 2270, 2300, 2400 (B), 2500, 2600, ZAY-260, 2700 (B), and 2770, SEIKAFAST RED 8040, C405 (F), CA120, LR-116, 1531B, 8060R, 1547, ZAW-262, 1537B, GY, 4R-4016, 3820, 3891, and ZA-215, SEIKAFAST CARMINE 6B1476T-7, 1483LT, 3840, and 3870, SEIKAFAST BORDEAUX 10B-430, SEIKA LIGHT ROSE R40, SEIKA LIGHT VIOLET B800 and 7805, SEIKAFAST MAROON 460N, SEIKAFAST ORANGE 900 and 2900, SEIKA LIGHT BLUE C718 and A612, and CYANINE BLUE 4933M, 4933GN-EP, 4940, and 4973 (all manufactured by Dainichiseika Color & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (all manufactured by DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (all manufactured by SANYO COLOR WORKS, Ltd.);

Lionol Yellow 1405G, Lionol Blue FG7330, FG7350, FG7400G FG7405G ES, and ESP-S (all manufactured by Toyo Ink SC Holdings Co., Ltd.), Toner Magenta E02, Permanent Rubin F6B, Toner Yellow HG, Permanent Yellow GG-02, and Hostapeam Blue B2G (all manufactured by Hoechst Industry Ltd.);

Novoperm P-HG; Hostaperm Pink E, and Hostaperm Blue B2G (all manufactured by Clariant International Ltd); and Carbon black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (all manufactured by Mitsubishi Chemical Corporation).

Dispersing the pigment can be performed, for example, by using a ball mill, a sand mill, an attritor, a roll mill, an agitator, a Henschel mixer, a colloid mill, an ultrasound homogenizer, a pearl mill, a wet jet mill, a paint shaker. Dispersing the pigment is preferably performed such that the average particle size of the pigment particles is preferably from 0.08 to 0.5 μm, and the maximum particle size is preferably from 0.3 to 10 μm, and more preferably from 0.3 to 3 μm. Dispersing the pigment is controlled by the selection of the pigment, a dispersant, and a dispersion medium, dispersion conditions, filtration conditions, and the like.

The actinic radiation-curable inkjet ink may further comprise a dispersant in order to improve the dispersibility of the pigment. Examples of the dispersant include hydroxy group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available dispersants include SOLSPERSE series of Avecia, and PB series of Ajinomoto Fine-Techno Co., Inc.

If necessary, the actinic radiation-curable inkjet ink may further comprise a dispersion promotor. The dispersion promotor can be selected according to the pigment.

The total amount of the dispersant and the dispersion promotor is preferably from equal to or greater than 1 to equal to or less than 50 mass % relative to the mass of the pigment.

If necessary, the actinic radiation-curable inkjet ink may further comprise a dispersion medium for dispersing the pigment. A solvent may be contained as the dispersion medium in the ink; however, the actinic radiation-curable compound as described above (particularly, low viscous monomer) is preferably used as the dispersion medium in order to prevent the solvent from remaining in a formed image.

The dye can be an oil soluble dye or the like. Examples of the oil soluble dye include the following various dyes. Examples of magenta dyes include MS Magenta VP, MS Magenta HM-1450, MS Magenta HSo-147 (all manufactured by Mitsui Chemicals, Inc.), AIZEN SOT Red-1, AIZEN SOT Red-2, AIZEN SOT Red-3, AIZEN SOT Pink-1, SPIRON Red GEH SPCIAL (all manufactured by Hodogaya Chemical Co., Ltd.), RESOLIN Red FB 200%, MACROLEX Red Violet R, MACROLEX ROTSB (all manufactured by Bayer Japan), KAYASET Red B, KAYASET Red 130, KAYASET Red 802 (all manufactured by Nippon Kayaku Co., Ltd.), PHLOXIN, ROSE BENGAL, ACID Red (all manufactured by Daiwa Kasei Co., Ltd.), HSR-31, DIARESIN Red K (all manufactured by Mitsubishi Chemical Corporation), and Oil Red (manufactured by BASF Japan Ltd.).

Examples of cyan dyes include MS Cyan HM-1238, MS Cyan HSo-16, Cyan HSo-144, MS Cyan VPG (all manufactured by Mitsui Chemicals, Inc.), AIZEN SOT Blue-4 (manufactured by Hodogaya Chemical Co., Ltd.), RESOLIN BR. Blue BGLN 200%, MACROLEX Blue RR, CERES Blue GN, SIRIUS SUPRA TURQ. Blue Z-BGL, SIRIUS SUPRA TURQ. Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku Co., Ltd.), DAIWA Blue 7000, Oleosol Fast Blue GL (all manufactured by Daiwa Kasei Co., Ltd.), DIARESIN Blue P (manufactured by Mitsubishi Chemical Corporation), SUDAN Blue 670, NEOPEN Blue 808, and ZAPON Blue 806 (all manufactured by BASF Japan Ltd.).

Example of yellow dyes include MS Yellow HSm-41, Yellow KX-7, Yellow EX-27 (all manufactured by Mitsui Chemicals, Inc.), AIZEN SOT Yellow-1, AIZEN SOT Yellow-3, AIZEN SOT Yellow-6 (all manufactured by Hodogaya Chemical Co., Ltd.), MACROLEX Yellow 6G, MACROLEX FLUOR. Yellow 10GN (all manufactured by Bayer Japan), KAYASET Yellow SF-G, KAYASET Yellow 2G, KAYASET Yellow A-Cc KAYASET Yellow E-G (all manufactured by Nippon Kayaku Co., Ltd.), DAIWA Yellow 330HB (manufactured by Daiwa Kasei Co., Ltd.), HSY-68 (manufactured by Mitsubishi Chemical Corporation), SUDAN Yellow 146, and NEOPEN Yellow 075 (all manufactured by BASF Japan Ltd.).

Examples of black dyes include MS Black VPC (manufactured by Mitsui Chemicals, Inc.), AIZEN SOT Black-1, AIZEN SOT Black-5 (all manufactured by Hodogaya Chemical Co., Ltd.), RESORIN Black GSN 200%, RESOLIN Black BS (all manufactured by Bayer Japan), KAYASET Black A-N (manufactured by Nippon Kayaku Co., Ltd.), DAIWA Black MSC (manufactured by Daiwa Kasei Co., Ltd.), HSB-202 (manufactured by Mitsubishi Chemical Corporation), NEPTUNE Black X60, and NEOPEN Black X58 (all manufactured by BASF Japan Ltd.).

The content of the pigment or the dye is preferably 0.1 mass % or more and 20 mass % or less, more preferably 0.4 mass % or more and 10 mass % or less relative to the total mass of the actinic radiation-curable inkjet ink.

[Additional Components]

If necessary, the actinic radiation-curable inkjet ink may further comprise other component(s). The additional components can be various additives and other resins. Examples of the additives include surfactants, leveling agents, matting agents, UV absorbers, IR absorbers, antibacterial agents, and basic compounds for improving the storage stability of the ink. Examples of the basic compounds include basic alkali metal compounds, basic alkali earth metal compounds, and basic organic compounds such as amines. Examples of the other resins include resins for adjusting the physical properties of a cured film, and examples of the resins include polyester resins, polyurethane resins, vinyl resins, acrylic resins, and rubber resins.

The actinic radiation-curable inkjet ink can be obtained by mixing the above-described actinic radiation curable compound, gelling agent and crystal nucleating agent, and other optional components under heating. The mixed liquid obtained is preferably filtered through a predetermined filter.

2. Inkjet Recording Method

The inkjet recording method according to the present invention includes at least the following two steps of:

(1) discharging the actinic radiation-curable inkjet ink of the present invention on a recording medium; and (2) irradiating the ink discharged on the recording medium with actinic radiation to cure the ink.

[Step (1)]

In step (1), droplets of an inkjet ink are discharged from an inkjet head to land on a recording medium. The ink to be used may be the above-described actinic radiation-curable inkjet ink.

The discharge type from the inkjet head may be any of an on-demand type and a continuous type. Examples of an on-demand type inkjet head include a single cavity type, a double cavity type, a bender type, a piston type, electromechanical transduction types including a share mode type and a shared wall type, and electrothermal transduction types including a thermal inkjet type and a bubblejet ("bubblejet" is a registered trademark of Canon Inc.) type.

The droplets of an inkjet ink can be discharged from an inkjet head with being heated, thereby resulting in an enhancement in discharge stability. The temperature of the inkjet ink in discharge is preferably 35° C. or more and 100° C. or less, and is more preferably 35° C. or more and 80° C. or less from the viewpoint of a more enhancement in discharge stability. The inkjet ink is preferably ejected at an ink temperature so that the viscosity thereof is 7 mPa·s or more and 15 mPa·s or less, more preferably 8 mPa·s or more and 13 mPa·s or less, from the viewpoint of a further enhancement in discharge stability.

Examples of the method for heating an inkjet ink to a predetermined temperature include a method of heating at least any of an ink supplying system including an ink tank that constitutes a head carriage, a supply pipe, an anterior ink tank immediately before the recording head, and the like; filter-attached piping; a piezo head; and the like to a predetermined temperature by any of a panel heater, a ribbon heater, temperature-regulated water, and the like.

The drop volume of the inkjet ink when discharged is preferably 2 pL or more and 20 pL or less from the viewpoint of making the recording speed fast and improving the image quality.

The recording medium for use in the inkjet recording method according to the present invention is directed to media of all of printing paper and general-purpose synthetic resins conventionally used in various applications. Specific examples include normal paper for use in copying and the like, wood-free paper for use in offset printing, coated paper, a base material made of paper, such as art paper, coated paper obtained by coating both surfaces of base paper with a resin or the like, and various types of laminated paper, synthetic paper and thin corrugated cardboard; and various non-absorbent plastics and films thereof for use in soft packaging. Examples of various plastic films include a PET film, an OPS film, an OPP film, an ONY film, a PVC film, a PE film and a TAC film. Metals, glass, and the like may also be used as the recording medium besides the above.

[Step (2)]

In step (2), the ink discharged on the recording medium is irradiated with actinic radiation to cure the ink. The step allows the actinic radiation curable compound included in the inkjet ink to be photo-cured.

Examples of the actinic radiation for irradiation include ultraviolet rays, near-ultraviolet rays, and natural light (including natural light passing through optical cut filter), and ultraviolet rays are preferable. As an irradiation light source for ultraviolet ray irradiation, for example, a mercury lamp, a metal halide lamp, excimer laser, ultraviolet laser, a cold cathode fluorescent lamp, a hot cathode fluorescent lamp, a black light, LED (light emitting diode), and the like are applicable; and a belt-like metal halide lamp, a cold cathode fluorescent lamp, a hot cathode fluorescent lamp, a mercury lamp, or a black light is preferable; The LED is particularly preferable because it has a long life and is inexpensive.

However, the LED is generally a single-wavelength light source, and the illuminance is liable to be lowered than that of a light source having a plurality of bright line spectra, such as a high pressure mercury lamp. In the case where curing is performed through radical polymerization, when the illuminance is low, a radical combines with oxygen to increase a ratio of deactivation. Therefore, even if the irradiation time is extended to make the cumulative light quantity the same, curing is hard to perform. Accordingly, inkjet inks are required to be curable at a low illuminance and a low cumulative light quantity.

The LED has advantages that instantaneous lighting is possible, the life is long, the radiant heat is small in amount, controlling the light quantity is easy, the wavelength width (half-width value) of emitted light is extremely narrow, the power consumption is small in amount, etc. The wavelength of an irradiation light source is preferably 280 nm or more and 420 nm or less, more preferably 350 nm or more and 410 nm or less.

The cumulative light quantity for irradiation of the droplets of the inkjet ink landed on the recording medium is preferably in a range of 10 mJ/cm$^2$ or more and 500 mJ/cm$^2$ or less. The cumulative light quantity in the range is advantageous from the viewpoint of energy saving, space saving, and costs.

The illuminance of the light from the irradiation source of actinic radiation is preferably 8 W/cm$^2$ or less, and more preferably 2 W/cm$^2$ or less on the recording medium. The light whose illuminance is 8 W/cm$^2$ or higher generates a large amount of heat, and therefore a recording medium having a weak heat resistance is liable to deform. Moreover, a problem that leaking light becomes large in amount, so that inks are cured on the nozzle surface of a head can occur. Furthermore, the light of high illuminance makes energy consumption high, needs a large space for a light source, and increases costs.

The method for irradiation with actinic radiation is not particularly limited, and the irradiation with the actinic radiation can be performed, for example, by the methods described below. A light source is provided on both sides of a head unit, a head and the light source are scanned by a shuttle method, and irradiation is performed at a certain time after an ink is landed. Further, light irradiation is performed from another light source without drive to complete curing (see Japanese Patent Application Laid-Open No. SHO 60-132767). Alternatively, light irradiation may be performed using an optical fiber, or light irradiation may be performed onto a recording section by reflecting ultraviolet rays from a collimated light source at a mirror surface provided on a side surface of a head unit (see U.S. Pat. No. 6,145,979).

Also, the irradiation with the actinic radiation may be separated into two stages. The first irradiation is preferably performed between 0.001 and 1.0 second after an ink droplet is landed on a recording medium. The second irradiation may be performed after the first irradiation. That is, the second irradiation may be performed on the downstream side of the first irradiation in the conveyance direction of the recording medium. The cumulative light quantity per unit area of the recording medium through the first irradiation (D1) is preferably smaller than the cumulative light quantity per unit area of the recording medium through the second irradiation (D2). That is, it is preferable to satisfy D1<D2. By separating the irradiation with the actinic radiation into two stages, the hardness of an image is improved and an image with little bleeding can be formed.

In the inkjet recording method according to the present invention, the total ink film thickness after an ink is landed on a recording medium and is then irradiated with actinic radiation to be cured is preferably 0.1 μm or more and 5 μm or less. The term "total ink film thickness" means the maximum value of the film thickness of an ink drawn on a recording medium. In any of a monochrome, superposition of two colors (secondary color), superposition of three colors, and superposition of four colors (white ink base), the total ink film thickness of these colors is preferably 0.1 μm or more and 5 μm or less.

Examples

Hereinafter, the present invention will be described specifically giving Examples, but the present invention is not limited to these Examples. It is to be noted that the term "parts" or "%" used in Examples represents "parts by weight" or "mass %" unless otherwise noted.

[Preparation of Pigment Dispersion 1]

The following respective additives were sequentially mixed and dispersed to prepare magenta pigment dispersion 1 containing 21 mass % of a magenta pigment.

The following respective compounds were put into a stainless beaker and then heated at 65° C. on a hot plate for 1 hour under stirring for dissolution.

Pigment dispersant: Ajisper PB824 (manufactured by Ajinomoto Fine-Techno Co., Inc.) 9 parts Actinic radiation curable compound: tripropylene glycol diacrylate 70 parts Polymerization inhibitor: Irgastab UV10 (manufactured by Ciba Japan K.K.) 0.02 parts Subsequently, the solution was cooled to room temperature, 21 parts of the magenta pigment described below was then added to the solution, the resultant mixture was put into a glass bottle together with 200 g of zirconia beads having a diameter of 0.5 mm to seal the glass bottle and was then subjected to dispersion treatment with a paint shaker for 8 hours, and thereafter the zirconia beads were removed to produce pigment dispersion 1.

Magenta pigment: Pigment Red 122 (CHROMOFINE RED 6112JC manufactured by Dainichiseika Color & Chemicals Mfg. Co., Ltd.)

[Preparation of Inks]

(Preparation of Ink 1)

The following respective additives were sequentially mixed, heated to 80° C. and stirred for 30 minutes, and thereafter the obtained solution was filtered through a metal mesh filter of #3000 under heating at 80° C., and cooled to prepare ink 1.

Actinic radiation curable compound: A-400 (polyethylene glycol #400 diacrylate, manufactured by Shin-Nakamura Chemical Co., Ltd.) 31.8 parts Actinic radiation curable compound: SR494 (4EO-modified pentaerythritol tetraacrylate, manufactured by Sartomer) 17.0 parts Actinic radiation curable compound: SR499 (6EO-modified trimethylol propane triacrylate, manufactured by Sartomer) 17.9 parts Gelling agent: Stearone 3.0 parts Crystal nucleating agent: tetraglycerin tristearate 0.20 parts Polymerization inhibitor: Irgastab UV10 (manufactured by Ciba Specialty Chemicals) 0.1 parts Photoinitiator: TPO (phosphine oxide, DAROCURE TPO, manufactured by Ciba Specialty Chemicals) 6.0 parts Photoinitiator: ITX (isopropylthioxanthone, Speedcure ITX, manufactured by Lambson Limited) 2.0 parts Photoinitiator auxiliary agent: EDB (amine auxiliary agent, Speedcure EDB, manufactured by Lambson Limited) 3.0 parts Pigment dispersion 1: 19.0 parts (Preparation of Inks 2 to 16)

Each of inks 2 to 16 was prepared in the same manner except that the type of the gelling agent and the type of the crystal nucleating agent were changed as described in Table 2, Table 3 and Table 4, in preparation of ink 1.

(Preparation of Inks 17 to 19)

Each of inks 17 to 19 was prepared in the same manner except that the crystal nucleating agent was changed to actinic radiation curable compound A-400 and was changed as described in Table 5, in preparation of ink 1.

(Preparation of Inks 20 to 26)

Each of inks 20 to 26 was prepared in the same manner except that the gelling agent was changed to Diundecyl ketone and the type of the crystal nucleating agent was changed as described in Table 6, in preparation of ink 1.

(Preparation of Inks 27 to 35)

Each of inks 27 to 35 was prepared in the same manner except that the types of the crystal nucleating agent and the gelling agent were changed as described in Table 7, in preparation of ink 1.

(Preparation of Inks 36 to 38)

Each of inks 36 to 38 was prepared in the same manner except that the type of the crystal nucleating agent was changed to tetraglycerin monolaurate and was changed as described in Table 8, in preparation of ink 1.

(Preparation of Inks 39 to 46)

Each of inks 39 to 46 was prepared in the same manner except that the amount of the crystal nucleating agent added, and the types of the crystal nucleating agent and the gelling agent were changed as described in Table 9, and adjustment by A-400 was made so that the decrease content of the amount of the crystal nucleating agent added was 100 parts by weight, in preparation of ink 1.

(Preparation of Inks 47 to 54)

Each of inks 47 to 54 was prepared in the same manner except that the amount of the crystal nucleating agent added, and the types of the crystal nucleating agent and the gelling agent were changed as described in Table 10, and adjustment by A-400 was made so that the decrease content of the amount of the crystal nucleating agent added was 100 parts by weight, in preparation of ink 1.

The detail of the gelling agent and the crystal nucleating agent used in preparation of each of inks 1 to 54 is as described in Table 1.

TABLE 1

|  |  | Trade name (manufacturer) | Number of carbon atoms | Main chain |
|---|---|---|---|---|
| Gelling agent | Stearone | Kao Wax T1 (manufactured by Kao Corporation) | C17-C17 | Ketone |
|  | Behenyl behenate | UNISTAR M-2222SL (manufactured by NOF CORPORATION) | C21-C22 | Ester |
|  | Stearyl stearate | EXCEPARL SS (manufactured by Kao Corporation) | C17-C18 | Ester |
|  | Diundecyl ketone | 12-Tricosanone (manufactured by Tokyo Chemical Industry Co., Ltd.) | C11-C11 | Ketone |
| Crystal nucleating agent | Tetraglycerin tristearate | TS-3S (manufactured by Sakamoto Yakuhin Kogyo Co., Ltd.) | C17 | Glycerin |
|  | Hexaglycerin tristearate | TS-5S (manufactured by Sakamoto Yakuhin Kogyo Co., Ltd.) | C17 | Glycerin |
|  | Decaglycerin tristearate | TS-7S (manufactured by Sakamoto Yakuhin Kogyo Co., Ltd.) | C17 | Glycerin |
|  | Decaglycerin tristearate heptabehenate | HB-750 (manufactured by Sakamoto Yakuhin Kogyo Co., Ltd.) | C22 | Glycerin |
|  | Tetraglycerin monolaurate | ML-310 (manufactured by Sakamoto Yakuhin Kogyo Co., Ltd.) | C11 | Glycerin |
|  | Polyethylene glycol monostearate | NIKKOL MYS-25V (manufactured by Nikko Chemicals Co., Ltd.) | C17 | Ethylene glycol |

TABLE 1-continued

|  | Trade name (manufacturer) | Number of carbon atoms | Main chain |
|---|---|---|---|
| Stearyl alcohol | Stearyl alcohol (manufactured by KOKYU ALCOHOL KOGYO CO., LTD.) | C17 | Alcohol |
| Lauryl alcohol | Lauryl alcohol (manufactured by KOKYU ALCOHOL KOGYO CO., LTD.) | C11 | Alcohol |

[Image Forming Method]

Each of inks 1 to 54 was used to form a monochrome image by a line type inkjet recording apparatus. The temperature of an inkjet head of the inkjet recording apparatus was set to 80° C. The temperature of a recording medium (OK Top Coat, unit basis weight: 128 g/m$^2$; manufactured by Oji Paper Co., Ltd.) was regulated in a range from 35° C. to 52° C., and a solid image of 5 cm×5 cm, with an outline letter, was printed on the recording medium. After the image was formed, the image was irradiated with ultraviolet rays from an LED lamp (manufactured by Phoseon Technology, 395 nm, water cooled LED) disposed downstream part of the recording apparatus, to cure an ink.

As the recording head for discharge, a piezo head where the nozzle diameter was 20 μm and the number of nozzles was 512 (256 nozzles×2 lines, staggered array, nozzle pitch per line: 360 dpi) was used. Ejection was made at a droplet rate of about 6 m/s in a condition where the amount of one droplet was 2.5 pl as a discharge condition to perform recording at a resolution of 1440 dpi×1,440 dpi. The recording rate was 500 mm/s. Formation of an image was performed under an environment of 23° C. and 55% RH. As described herein, dpi represents the number of dots per 2.54 cm.

[Evaluation]

(Center Temperature)

Intermediate temperature between the temperature where the solid section was filled (the solid image was visually confirmed) and the temperature where combining of droplets was started (a 4-pt outline letter was visually confirmed)

A: 38° C. or more and 43° C. or less

B: more than 43° C. and 46° C. or less, or 35° C. or more and less than 38° C.

D: more than 46° C., or less than 35° C.

(Base Material Temperature Robustness)

Evaluation as the difference between the temperature where the solid image was filled and the temperature where combining of droplets was started A: 10° C. or more B: 7° C. or more and less than 10° C.

C: 4° C. or more and less than 7° C.

D: less than 4° C.

The composition and evaluation results of each ink are shown in Tables 2 to 10. The numerical value with respect to each component in Tables 2 to 10 is represented in terms of "mass %".

TABLE 2

|  |  | Ink 1 Example 1 | Ink 2 Example 2 | Ink 3 Example 3 | Ink 4 Example 4 | Ink 5 Example 5 | Ink 6 Example 6 |
|---|---|---|---|---|---|---|---|
| Photocurable compound, photoinitiator, and others |  | 96.80% | 96.80% | 96.80% | 96.80% | 96.80% | 96.80% |
| Gelling agent 1 | Stearone | 3.00% | 3.00% | 3.00% | 3.00% |  |  |
| Gelling agent 2 | Behenyl behenate |  |  |  |  | 3.00% | 3.00% |
| Gelling agent 3 | Stearyl stearate |  |  |  |  |  |  |
| Gelling agent 4 | Diundecyl ketone |  |  |  |  |  |  |
| Crystal nucleating agent 1 | TS-3S | 0.20% |  |  |  | 0.20% |  |
| Crystal nucleating agent 2 | TS-5S |  | 0.20% |  |  |  | 0.20% |
| Crystal nucleating agent 3 | TS-7S |  |  | 0.20% |  |  |  |
| Crystal nucleating agent 4 | HB-750 |  |  |  | 0.20% |  |  |
| Crystal nucleating agent 5 (comparative) | ML-310 |  |  |  |  |  |  |
| Crystal nucleating agent 6 (comparative) | NIKKOL MYS-25V |  |  |  |  |  |  |
| Crystal nucleating agent 7 (comparative) | Stearyl alcohol |  |  |  |  |  |  |

TABLE 2-continued

|  |  | Ink 1 Example 1 | Ink 2 Example 2 | Ink 3 Example 3 | Ink 4 Example 4 | Ink 5 Example 5 | Ink 6 Example 6 |
|---|---|---|---|---|---|---|---|
| Crystal nucleating agent 8 (comparative) | Lauryl alcohol |  |  |  |  |  |  |
| Evaluation items | Center temperature | B | B | B | B | B | B |
|  | Base material temperature robustness | B | B | B | A | B | B |

TABLE 3

|  |  | Ink 7 Example 7 | Ink 8 Example 8 | Ink 9 Example 9 | Ink 10 Example 10 | Ink 11 Example 11 | Ink 12 Example 12 |
|---|---|---|---|---|---|---|---|
| Photocurable compound, photoinitiator, and others |  | 96.80% | 96.80% | 96.80% | 96.80% | 96.80% | 96.80% |
| Gelling agent 1 | Stearone |  |  |  |  |  |  |
| Gelling agent 2 | Behenyl behenate | 3.00% | 3.00% |  |  |  |  |
| Gelling agent 3 | Stearyl stearate |  |  | 3.00% | 3.00% | 3.00% | 3.00% |
| Gelling agent 4 | Diundecyl ketone |  |  |  |  |  |  |
| Crystal nucleating agent 1 | TS-3S |  |  | 0.20% |  |  |  |
| Crystal nucleating agent 2 | TS-5S |  |  |  | 0.20% |  |  |
| Crystal nucleating agent 3 | TS-7S | 0.20% |  |  |  | 0.20% |  |
| Crystal nucleating agent 4 | HB-750 |  | 0.20% |  |  |  | 0.20% |
| Crystal nucleating agent 5 (comparative) | ML-310 |  |  |  |  |  |  |
| Crystal nucleating agent 6 (comparative) | NIKKOL MYS-25V |  |  |  |  |  |  |
| Crystal nucleating agent 7 (comparative) | Stearyl alcohol |  |  |  |  |  |  |
| Crystal nucleating agent 8 (comparative) | Lauryl alcohol |  |  |  |  |  |  |
| Evaluation items | Center temperature | B | B | A | A | A | A |
|  | Base material temperature robustness | B | A | B | B | B | B |

TABLE 4

|  |  | Ink 13 Example 13 | Ink 14 Example 14 | Ink 15 Example 15 | Ink 16 Example 16 |
|---|---|---|---|---|---|
| Photocurable compound, photoinitiator, and others |  | 94.60% | 96.97% | 96.70% | 95.80% |
| Gelling agent 1 | Stearone |  |  |  |  |
| Gelling agent 2 | Behenyl behenate | 3.00% | 3.00% | 3.00% | 3.00% |
| Gelling agent 3 | Stearyl stearate |  |  |  |  |
| Gelling agent 4 | Diundecyl ketone |  |  |  |  |
| Crystal nucleating agent 1 | TS-3S |  |  |  |  |
| Crystal nucleating agent 2 | TS-5S | 2.40% | 0.03% | 0.30% | 1.20% |
| Crystal nucleating agent 3 | TS-7S |  |  |  |  |
| Crystal nucleating agent 4 | HB-750 |  |  |  |  |

TABLE 4-continued

|  |  | Ink 13 Example 13 | Ink 14 Example 14 | Ink 15 Example 15 | Ink 16 Example 16 |
|---|---|---|---|---|---|
| Crystal nucleating agent 5 (comparative) | ML-310 |  |  |  |  |
| Crystal nucleating agent 6 (comparative) | NIKKOL MYS-25V |  |  |  |  |
| Crystal nucleating agent 7 (comparative) | Stearyl alcohol |  |  |  |  |
| Crystal nucleating agent 8 (comparative) | Lauryl alcohol |  |  |  |  |
| Evaluation items | Center temperature | B | B | A | A |
|  | Base material temperature robustness | B | B | A | A |

TABLE 5

|  |  | Ink 17 Comparative Example 1 | Ink 18 Comparative Example 2 | Ink 19 Comparative Example 3 |
|---|---|---|---|---|
| Photocurable compound, photoinitiator, and others |  | 97.00% | 97.00% | 97.00% |
| Gelling agent 1 | Stearone | 3.00% |  |  |
| Gelling agent 2 | Behenyl behenate |  | 3.00% |  |
| Gelling agent 3 | Stearyl stearate |  |  | 3.00% |
| Gelling agent 4 | Diundecyl ketone |  |  |  |
| Crystal nucleating agent 1 | TS-3S |  |  |  |
| Crystal nucleating agent 2 | TS-5S |  |  |  |
| Crystal nucleating agent 3 | TS-7S |  |  |  |
| Crystal nucleating agent 4 | HB-750 |  |  |  |
| Crystal nucleating agent 5 (comparative) | ML-310 |  |  |  |
| Crystal nucleating agent 6 (comparative) | NIKKOL MYS-25V |  |  |  |
| Crystal nucleating agent 7 (comparative) | Stearyl alcohol |  |  |  |
| Evaluation items | Center temperature | B | B | A |
|  | Base material temperature robustness | D | C | D |

TABLE 6

|  |  | Ink 20 Comparative Example 4 | Ink 21 Comparative Example 5 | Ink 22 Comparative Example 6 | Ink 23 Comparative Example 7 | Ink 24 Comparative Example 8 | Ink 25 Comparative Example 9 | Ink 26 Comparative Example 10 |
|---|---|---|---|---|---|---|---|---|
| Photocurable compound, photoinitiator, and others |  | 97.00% | 96.80% | 96.80% | 96.80% | 96.80% | 96.80% | 96.80% |
| Gelling agent 1 | Stearone |  |  |  |  |  |  |  |
| Gelling agent 2 | Behenyl behenate |  |  |  |  |  |  |  |
| Gelling agent 3 | Stearyl stearate |  |  |  |  |  |  |  |
| Gelling agent 4 | Diundecyl ketone | 3.00% | 3.00% | 3.00% | 3.00% | 3.00% | 3.00% | 3.00% |
| Crystal nucleating agent 1 | TS-3S |  | 0.20% |  |  |  |  |  |
| Crystal nucleating agent 2 | TS-5S |  |  | 0.20% |  |  |  |  |
| Crystal nucleating agent 3 | TS-7S |  |  |  | 0.20% |  |  |  |
| Crystal nucleating agent 4 | HB-750 |  |  |  |  | 0.20% |  |  |
| Crystal nucleating agent 5 (comparative) | ML-310 |  |  |  |  |  | 0.20% |  |
| Crystal nucleating agent 6 (comparative) | NIKKOL MYS-25V |  |  |  |  |  |  | 0.20% |
| Crystal nucleating agent 7 (comparative) | Stearyl alcohol |  |  |  |  |  |  |  |

TABLE 6-continued

|  |  | Ink 20 Comparative Example 4 | Ink 21 Comparative Example 5 | Ink 22 Comparative Example 6 | Ink 23 Comparative Example 7 | Ink 24 Comparative Example 8 | Ink 25 Comparative Example 9 | Ink 26 Comparative Example 10 |
|---|---|---|---|---|---|---|---|---|
| Evaluation items | Center temperature | D | D | D | D | D | D | D |
|  | Base material temperature robustness | D | D | D | D | D | D | D |

TABLE 7

|  |  | Ink 27 Comparative Example 11 | Ink 28 Comparative Example 12 | Ink 29 Comparative Example 13 | Ink 30 Comparative Example 14 | Ink 31 Comparative Example 15 |
|---|---|---|---|---|---|---|
| Photocurable compound, photoinitiator, and others |  | 96.80% | 96.80% | 96.80% | 96.80% | 96.80% |
| Gelling agent 1 | Stearone | 3.00% |  |  | 3.00% |  |
| Gelling agent 2 | Behenyl behenate |  | 3.00% |  |  | 3.00% |
| Gelling agent 3 | Stearyl stearate |  |  | 3.00% |  |  |
| Gelling agent 4 | Diundecyl ketone |  |  |  |  |  |
| Crystal nucleating agent 1 | TS-3S |  |  |  |  |  |
| Crystal nucleating agent 2 | TS-5S |  |  |  |  |  |
| Crystal nucleating agent 3 | TS-7S |  |  |  |  |  |
| Crystal nucleating agent 4 | HB-750 |  |  |  |  |  |
| Crystal nucleating agentv5 (comparative) | ML-310 | 0.20% | 0.20% | 0.20% |  |  |
| Crystal nucleating agent 6 (comparative) | NIKKOL MYS-25V |  |  |  | 0.20% | 0.20% |
| Crystal nucleating agent 7 (comparative) | Stearyl alcohol |  |  |  |  |  |
| Evaluation items | Center temperature | B | B | A | B | B |
|  | Base material temperature robustness | D | C | D | D | C |

|  |  | Ink 32 Comparative Example 16 | Ink 33 Comparative Example 17 | Ink 34 Comparative Example 18 | Ink 35 Comparative Example 19 |
|---|---|---|---|---|---|
| Photocurable compound, photoinitiator, and others |  | 96.80% | 96.80% | 96.80% | 96.80% |
| Gelling agent 1 | Stearone |  | 3.00% |  |  |
| Gelling agent 2 | Behenyl behenate |  |  | 3.00% |  |
| Gelling agent 3 | Stearyl stearate | 3.00% |  |  | 3.00% |
| Gelling agent 4 | Diundecyl ketone |  |  |  |  |
| Crystal nucleating agent 1 | TS-3S |  |  |  |  |
| Crystal nucleating agent 2 | TS-5S |  |  |  |  |

TABLE 7-continued

| | | | | | |
|---|---|---|---|---|---|
| Crystal nucleating agent 3 | TS-7S | | | | |
| Crystal nucleating agent 4 | HB-750 | | | | |
| Crystal nucleating agent 5 (comparative) | ML-310 | | | | |
| Crystal nucleating agent 6 (comparative) | NIKKOL MYS-25V | 0.20% | | | |
| Crystal nucleating agent 7 (comparative) | Stearyl alcohol | | 0.20% | 0.20% | 0.20% |
| Evaluation items | Center temperature | A | B | B | A |
| | Base material temperature robustness | D | D | C | D |

TABLE 8

| | | Ink 36 Comparative Example 20 | Ink 37 Comparative Example 21 | Ink 38 Comparative Example 22 |
|---|---|---|---|---|
| Photocurable compound, photoinitiator, and others | | 96.80% | 96.80% | 96.80% |
| Gelling agent 1 | Stearone | 3.00% | | |
| Gelling agent 2 | Behenyl behenate | | 3.00% | |
| Gelling agent 3 | Stearyl stearate | | | 3.00% |
| Gelling agent 4 | Diundecyl ketone | | | |
| Crystal nucleating agent 1 | TS-3S | | | |
| Crystal nucleating agent 2 | TS-5S | | | |
| Crystal nucleating agent 3 | TS-7S | | | |
| Crystal nucleating agent 4 | HB-750 | | | |
| Crystal nucleating agent 5 (comparative) | ML-310 | 0.20% | 0.20% | 0.20% |
| Crystal nucleating agent 6 (comparative) | NIKKOL MYS-25V | | | |
| Crystal nucleating agent 7 (comparative) | Stearyl alcohol | | | |
| Crystal nucleating agent 8 (comparative) | Lauryl alcohol | | | |
| Evaluation items | Center temperature | B | B | A |
| | Base material temperature robustness | D | C | D |

TABLE 9

| | | Ink 39 Comparative Example 23 | Ink 40 Comparative Example 24 | Ink 41 Comparative Example 25 | Ink 42 Comparative Example 26 | Ink 43 Comparative Example 27 | Ink 44 Comparative Example 28 | Ink 45 Comparative Example 29 | Ink 46 Comparative Example 30 |
|---|---|---|---|---|---|---|---|---|---|
| Photocurable compound, photoinitiator, and others | | 96.98% | 96.98% | 96.98% | 96.98% | 96.98% | 96.98% | 96.98% | 96.98% |
| Gelling agent 1 | Stearone | 3.00% | 3.00% | 3.00% | 3.00% | | | | |
| Gelling agent 2 | Behenyl behenate | | | | | 3.00% | 3.00% | 3.00% | 3.00% |
| Gelling agent 3 | Stearyl stearate | | | | | | | | |
| Gelling agent 4 | Diundecyl ketone | | | | | | | | |

TABLE 9-continued

|  |  | Ink 39 Comparative Example 23 | Ink 40 Comparative Example 24 | Ink 41 Comparative Example 25 | Ink 42 Comparative Example 26 | Ink 43 Comparative Example 27 | Ink 44 Comparative Example 28 | Ink 45 Comparative Example 29 | Ink 46 Comparative Example 30 |
|---|---|---|---|---|---|---|---|---|---|
| Crystal nucleating agent 1 | TS-3S | 0.02% |  |  |  | 0.02% |  |  |  |
| Crystal nucleating agent 2 | TS-5S |  | 0.02% |  |  |  | 0.02% |  |  |
| Crystal nucleating agent 3 | TS-7S |  |  | 0.02% |  |  |  | 0.02% |  |
| Crystal nucleating agent 4 | HB-750 |  |  |  | 0.02% |  |  |  | 0.02% |
| Evaluation items | Center temperature | B | B | B | B | B | B | B | B |
|  | Base material temperature robustness | D | D | D | D | C | C | C | C |

TABLE 10

|  |  | Ink 47 Comparative Example 31 | Ink 48 Comparative Example 32 | Ink 49 Comparative Example 33 | Ink 50 Comparative Example 34 | Ink 51 Comparative Example 35 | Ink 52 Comparative Example 36 | Ink 53 Comparative Example 37 | Ink 54 Comparative Example 38 |
|---|---|---|---|---|---|---|---|---|---|
| Photocurable compound, photoinitiator, and others |  | 94.50% | 94.50% | 94.50% | 94.50% | 94.50% | 94.50% | 94.50% | 94.50% |
| Gelling agent 1 | Stearone | 3.00% | 3.00% | 3.00% | 3.00% |  |  |  |  |
| Gelling agent 2 | Behenyl behenate |  |  |  |  | 3.00% | 3.00% | 3.00% | 3.00% |
| Gelling agent 3 | Stearyl stearate |  |  |  |  |  |  |  |  |
| Gelling agent 4 | Diundecyl ketone |  |  |  |  |  |  |  |  |
| Crystal nucleating agent 1 | TS-3S | 2.50% |  |  |  | 2.50% |  |  |  |
| Crystal nucleating agent 2 | TS-5S |  | 2.50% |  |  |  | 2.50% |  |  |
| Crystal nucleating agent 3 | TS-7S |  |  | 2.50% |  |  |  | 2.50% |  |
| Crystal nucleating agent 4 | HB-750 |  |  |  | 2.50% |  |  |  | 2.50% |
| Evaluation items | Center temperature | D | D | D | D | D | D | D | D |
|  | Base material temperature robustness | B | B | B | B | A | A | A | A |

The present application is entitled to and claims the benefit of Japanese Patent Application No. 2016-009134, filed on Jan. 20, 2016. The contents of the specification of the application are incorporated herein by reference in its entirety.

The invention claimed is:

1. An actinic radiation-curable inkjet ink comprising an actinic radiation curable compound and a gelling agent, wherein
   the gelling agent comprises at least one $C_{15}$-$C_{26}$ alkyl group,
   the actinic radiation-curable inkjet ink comprises a crystal nucleating agent,
   the crystal nucleating agent comprises (poly)glycerin fatty acid ester compound A having a (poly)glycerin main chain and an alkyl group having 15 or more carbon atoms bound to the (poly)glycerin main chain, and
   a content of (poly)glycerin fatty acid ester compound A relative to a total mass of the gelling agent is 1.0 mass % or more and 80 mass % or less.

2. The actinic radiation-curable inkjet ink according to claim 1, wherein a difference between the number of carbon atoms of the alkyl group in the gelling agent and the number of carbon atoms of the alkyl group in compound A is 2 or less.

3. The actinic radiation-curable inkjet ink according to claim 1, wherein a content of the gelling agent relative to a total mass of the actinic radiation-curable inkjet ink is 1 mass % or more and 10 mass % or less.

4. An inkjet recording method comprising:
   discharging the actinic radiation-curable inkjet ink according to claim 1 on a recording medium, and
   irradiating the ink discharged on the recording medium with actinic radiation to cure the ink.

* * * * *